United States Patent
Rieth

(10) Patent No.: US 10,343,697 B2
(45) Date of Patent: Jul. 9, 2019

(54) DRIVER ASSISTANCE SYSTEM AND METHOD FOR AUTOMATICALLY LOGGING LOG DATA

(71) Applicant: Continental Teves AG & Co. oHG, Frankfurt (DE)

(72) Inventor: Peter E Rieth, Eltville (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 55 days.

(21) Appl. No.: 15/309,750

(22) PCT Filed: Apr. 30, 2015

(86) PCT No.: PCT/DE2015/200290
§ 371 (c)(1),
(2) Date: Feb. 22, 2017

(87) PCT Pub. No.: WO2015/169312
PCT Pub. Date: Nov. 12, 2015

(65) Prior Publication Data
US 2017/0197632 A1    Jul. 13, 2017

(30) Foreign Application Priority Data
May 8, 2014 (DE) .................. 10 2014 208 638

(51) Int. Cl.
*B60W 50/08* (2012.01)
*G07C 5/08* (2006.01)
(Continued)

(52) U.S. Cl.
CPC ...... *B60W 50/082* (2013.01); *B60W 50/0098* (2013.01); *G07C 5/085* (2013.01);
(Continued)

(58) Field of Classification Search
CPC ......... B60W 50/082; B60W 2050/143; B60W 50/0098; G07C 5/0866; G07C 5/085
(Continued)

(56) References Cited

U.S. PATENT DOCUMENTS

2009/0024274 A1* 1/2009 Nagai .................. G01D 9/005
701/33.4
2012/0166038 A1* 6/2012 Nishino ................ B62D 41/00
701/32.2
(Continued)

FOREIGN PATENT DOCUMENTS

CN    201886532 U    6/2011
CN    202358096 U    8/2012
(Continued)

OTHER PUBLICATIONS

English Translation: Schickram, European Patent Publication EP 2314489 A1, Apr. 2011, European Patent Office (Year: 2011).*
(Continued)

*Primary Examiner* — Nadeem Odeh

(57) ABSTRACT

A driver assistance system and a method for automatically logging a transition of the responsibility during a status change between fully automatic operation and manual operation of a motor vehicle is provided. The driver assistance system and the method include an event data recorder with a data storage and with a control unit. The control unit is designed such that a time-limited recording of log data is triggered by means of the data storage when a pre-warning signal, which announces the status change between fully automatic vehicle operation and manual vehicle operation, is transmitted to the control unit. In this manner, a secure logging process of the transition of the responsibility is ensured.

10 Claims, 1 Drawing Sheet

(51) Int. Cl.
    *B60W 50/00*       (2006.01)
    *B60W 50/14*       (2012.01)
(52) U.S. Cl.
    CPC ... *G07C 5/0866* (2013.01); *B60W 2050/0096* (2013.01); *B60W 2050/143* (2013.01); *B60W 2420/42* (2013.01); *B60W 2540/02* (2013.01)
(58) Field of Classification Search
    USPC ........................................ 701/23, 32.2, 33.4
    See application file for complete search history.

(56) References Cited

U.S. PATENT DOCUMENTS

| | | |
|---|---|---|
| 2013/0096731 A1 | 4/2013 | Tamari et al. |
| 2014/0049646 A1* | 2/2014 | Nix .................. B60R 1/002 348/148 |

FOREIGN PATENT DOCUMENTS

| | | | |
|---|---|---|---|
| DE | 10144797 A1 | 3/2003 | |
| DE | 102008047727 A1 | 3/2010 | |
| DE | 102009050399 A1 | 5/2011 | |
| DE | 102009050404 A1 | 5/2011 | |
| DE | 102009060391 A1 | 6/2011 | |
| DE | 102013003496 A1 | 8/2013 | |
| EP | 2314489 A1 * | 4/2011 | ............ B60W 40/08 |
| EP | 2314489 A1 | 4/2011 | |

OTHER PUBLICATIONS

German Search Report dated Jan. 7, 2015 for corresponding German Patent Application No. 10 2014 208 638.8.

\* cited by examiner

DRIVER ASSISTANCE SYSTEM AND METHOD FOR AUTOMATICALLY LOGGING LOG DATA

TECHNICAL FIELD

The disclosure relates to a driver assistance system of a motor vehicle and a method for automatically logging log data.

BACKGROUND

Motor vehicles are currently increasingly being equipped with driver assistance systems, which assist a vehicle operator or a driver during the operation of the motor vehicle, for use in road traffic. In particular, driver assistance systems serve to increase safety and prevent accidents. Nowadays driver assistance systems are not only frequently designed to assist the driver, but are also intended to increasingly take over the operation of the vehicle fully automatically for temporary periods, which is associated with additional safety-critical requirements.

SUMMARY

Starting from this, it is desirable to make possible an improved driver assistance system that is configured to operate the vehicle fully automatically.

A driver assistance system having an event data recorder is provided. The event data recorder is thereby used for automatically logging a transition of the responsibility during a status change between fully automatic operation and manual operation of a motor vehicle, in particular of a motor vehicle for use in road traffic. The event data recorder is hereby part of the driver assistance system, by means of which fully automatic vehicle operation is made possible. The event data recorder is optionally integrated into a control component of the driver assistance system or configured as an independent modular unit, in order to supplement and, possibly, retrofit a driver assistance system.

The event data recorder includes a data storage and a control unit, where the control unit is designed such that a time-limited recording of log data is triggered by means of the data storage when a pre-warning signal, which announces the status change between fully automatic vehicle operation and manual vehicle operation, is transmitted to the control unit. The recording of the log data is thereby triggered by the pre-warning signal. The recording starts, for example, with the pre-warning signal or is delayed by a short interval of, for example, a few seconds.

The underlying idea is based on the consideration that in driver assistance systems, which not only assist a vehicle operator or driver of a motor vehicle but which take over operation of the motor vehicle completely if necessary or if desired and which are therefore configured for fully automatic vehicle operation, the status change between fully automatic vehicle operation by the assistance system and manual vehicle operation by the driver is critical.

The respective vehicle operator or driver can, if necessary, suspend manual operation of the motor vehicle and hand over the vehicle operation to the driver assistance system. In this case, the term "fully automatic vehicle operation" means that the respective vehicle operator or driver does not assume any control or monitoring function at all during fully automatic vehicle operation, so that the mental burden on the vehicle operator is also almost 100% removed and the vehicle operator can deal with something else during fully automatic vehicle operation, i.e., read a book for example.

Depending on national legislation, the consequence of this is that during a status change between manual vehicle operation and fully automatic vehicle operation, the responsibility is also transferred. Therefore, whilst the respective vehicle operator bears the responsibility for the operation of the vehicle while the vehicle is being operated manually, i.e., by the vehicle operator, the responsibility lies with the manufacturer of the motor vehicle for as long as fully automatic vehicle operation is activated and the motor vehicle is being controlled by the driver assistance system. This transition of the responsibility during each status change between manual vehicle operation and fully automatic vehicle operation is of particular importance in the event of an accident, since the party responsible at the time of the accident is liable for any damage resulting from the accident. It is therefore desirable, both from the viewpoint of the manufacturer of the motor vehicle and from the viewpoint of the respective vehicle operator or driver of the motor vehicle, to be able to prove, in the event of an accident, who was responsible at the time of the accident and who is therefore liable for any damage resulting from the accident. It is possible to provide suitable proof with the aid of the event data recorder presented here, since this logs the transition of the responsibility during a status change between fully automatic vehicle operation and manual vehicle operation automatically and in an automated manner and, in the process, records log data that provides suitable evidence of who was responsible at the time of an accident.

The facts of the matter are relatively straightforward if, for example, the driver activates or switches on an operating mode of a driver assistance system by means of voice control or by activating a control element that is designed to operate the vehicle fully automatically. The status is changed from manual vehicle operation by the respective vehicle operator or driver to fully automatic vehicle operation by the driver assistance system and this occurs at almost the same time as the input of an appropriate control command by operating the control element or the appropriate voice command. The status change from fully automatic vehicle operation to manual vehicle operation is also designed to be comparatively simple in most cases, where the status change is either initiated, in turn, by a voice command or by operating a control element or by a manual intervention on the part of the respective vehicle operator or driver, for example by the latter executing a steering maneuver or activating a pedal, for example the brake pedal.

However, the particular case when the driver assistance system prompts the driver to take back responsibility for driving and thus accountability, for example because of an error being detected—i.e., when a status change between fully automatic vehicle operation and manual vehicle operation is therefore not initiated by the respective vehicle operator but by the driver assistance system itself—is particularly important. Such status changes that are almost imposed on the respective vehicle operator are thereby part of a backup function, with the aid of which defective vehicle operation by the driver assistance system is to be avoided.

If, for example, a sensor system which is necessary to operate the vehicle fully automatically is operating in a defective manner or fails due to a defect, this will result in an error message in the driver assistance system and a pre-warning signal, which announces the status change between fully automatic vehicle operation and manual vehicle operation, will then be generated on the basis of this error message. The status change is therefore not effected straight away, i.e., for example immediately the error occurs, but is deliberately delayed. The reason for this is quite simply the fact that the relevant status change is not initiated by the respective vehicle operator or driver and that the latter needs some time, depending on the situation, to prepare for the status change and therefore for taking over the vehicle operation. Accordingly, the respective vehicle operator is pre-warned with the aid of the pre-warning signal that fully automatic vehicle operation will shortly be stopped and that the vehicle operator must therefore resume operation of the vehicle.

The recording of log data over a particular interval starting from the pre-warning signal makes it possible to comprehend if necessary, i.e., for example if an accident occurs during the relevant period, whether the status change between fully automatic operation and manual operation of the motor vehicle took place as planned and at what time the responsibility was transferred to the respective vehicle operator or driver. In this case, the exact time of the transition depends, for example, on the reaction speed of the respective vehicle operator, i.e., on how long it takes until the respective vehicle operator manually executes steering maneuvers again. For example, sensor data from sensors that capture steering movements or pedal movements, i.e., for example movements of the brake pedal, are therefore suitable as log data, since this shows when the respective vehicle operator manually intervened again in the vehicle operation and thus took over the vehicle operation.

Depending on the application scenario, very different data is used as the log data, where the log data preferably includes at least the pre-warning signal or the time of the pre-warning signal, i.e., in particular the time that the pre-warning signal is transmitted. The status change between fully automatic operation and manual operation of the motor vehicle is almost started or initiated and announced with the aid of the pre-warning signal. Usually, the relevant responsibility for any liability claims is notionally automatically transferred to the vehicle operator following a specified pre-warning interval, even if the latter does not actively intervene. Accordingly, the information regarding the time of the pre-warning signal is of particular importance for proving that the vehicle operation was correctly handed over.

It is additionally advantageous that in some examples, the log data includes image data from an interior camera in the motor vehicle, which reproduces the actions or behavior of the respective vehicle operator following the pre-warning signal. This example is particularly inexpensive, if a camera for monitoring the interior is provided anyway. Suitable cameras are used, for example, to analyze the condition of the vehicle operator and to implement a warning system, which draws the attention of the respective vehicle operator to problematic behavior suggesting, for example, fatigue or inattention. In this case, the image data from such a camera or interior camera may then be additionally used, if needed, as log data.

Expediently, the pre-warning signal is automatically generated by the driver assistance system itself and is transmitted to the control unit of the event data recorder, in order to start temporary recording of the log data.

In addition, an audible and/or a visual signal, by means of which the respective vehicle operator or driver of the motor vehicle is pre-warned, is also preferably generated at the same time as the pre-warning signal. In an advantageous further development further warning signals are additionally emitted visually and/or audibly up to the status change between fully automatic vehicle operation and manual vehicle operation, wherein the warning signals more preferably have the effect of being increasingly "more threatening", so that the respective vehicle operator is almost warned in several escalation stages. This can be achieved, for example, with an audible signal in that the volume, the frequency and/or the duration of the signal increase(s) from signal to signal.

In the case of a status change between fully automatic vehicle operation and manual vehicle operation which is almost imposed on the respective vehicle operator for safety reasons, the driver assistance system therefore generally changes after a predetermined pre-warning interval starting from the transmission of the pre-warning signal from a first status or operating mode "fully automatic" to a second status or operating mode "manual". This change of the status is initially primarily notional and specifies the time of the change of responsibility, if the driver does not actively intervene. The status change does not necessarily mean that fully automatic vehicle operation is stopped if, for example, the driver does not actively intervene. The motor vehicle may be placed into emergency mode, if there is no reaction on the part of the respective vehicle operator, for example for health reasons, and is brought to a stop for example, if the traffic situation allows this. The pre-warning interval is preferably a few seconds, for example in the range of 5 to 20 seconds and, in particular, 10 seconds.

The time-limited recording of log data may be terminated following a control interval starting with the status change to the second status "manual". The control interval is, in particular, also several seconds, for example 5 to 20 seconds. This can limit the data volume of a suitable recording, amongst other things.

It is also advantageous, if the log data is permanently stored in the data storage, if an accident event signal is transmitted to the control unit within a specified event interval. Since the event data recorder is primarily used, in the event of an accident, to be able to prove who was responsible at the time of the accident, the log data may as a rule be needed if an accident actually occurs. If this happens, it is ensured that the relevant log data remains in the data storage at least until this has been read out and backed up in an external device. If, on the other hand, no accident occurs, the log data is deleted again after a certain amount of time has elapsed or the corresponding area of the data storage has been overwritten again.

The time of the start of the event interval is, for example, the time of the pre-warning signal, the time of the change between the two statuses or a time between these. The event interval preferably ends with the end of the control interval, is therefore generally a few tens of seconds, for example 10 to 20 seconds.

A corresponding accident event signal is thereby generated, for example during the triggering of an airbag, and is transmitted by an airbag control unit to the control unit of the event data recorder. Alternatively or in addition thereto, a corresponding accident event signal is generated by the sensors or the control unit of a parking aid.

In order to keep the technical outlay for producing the event data recorder and, in particular, for the data storage as low as possible, it is also advantageous to use the data storage in the manner of so-called rolling storage. This means that log data is stored in the data storage until the latter is full, and the stored log data is subsequently overwritten, where the oldest stored log data is overwritten first. As a result, data storage with less capacity may then be used for the event data recorder. In the event of an accident, a particular area of the data storage, in which the corresponding log data is stored, is blocked, so that this area is not subsequently overwritten. This blocking is maintained until the relevant data has been read out and backed up in an external device.

According to one aspect of the disclosure, the event data recorder is also simultaneously configured for logging accident reconstruction data, on the basis of which accident events, i.e., in particular the sequence of an accident, can be reconstructed. In this case, the event data recorder then additionally serves as a so-called accident data recorder or as a so-called black box.

The log data and the accident reconstruction data are preferably recorded independently of each other and, more preferably, are stored independently of each other in various data storage devices or data storage areas. In this case, data which is contained in both the log data and in the accident reconstruction data is stored twice.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
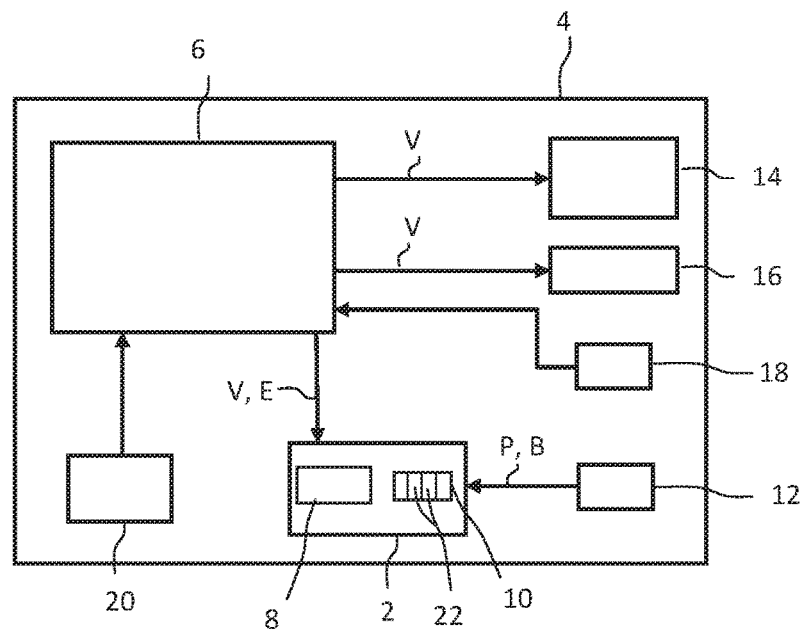
FIG. 1 shows a motor vehicle having a driver assistance system and an event data recorder in a block diagram representation.
Figure 2:
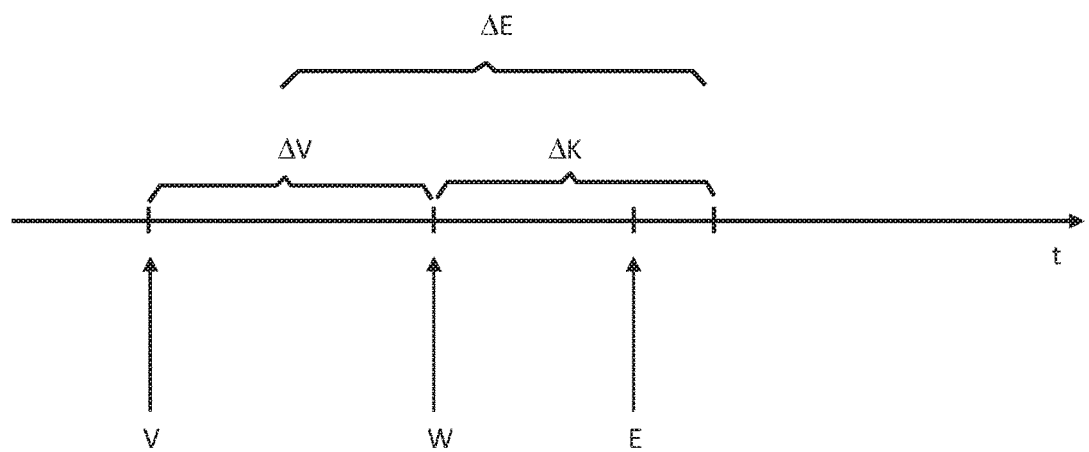
FIG. 2 shows a schematic diagram of the timing.

Referring to FIG. 1, an event data recorder 2 is installed in a motor vehicle 4 that is configured as a passenger car and supplements a driver assistance system 6 in the example described below.

The driver assistance system 6 is designed to be operated in two different operating modes. The motor vehicle 4 is operated manually in a first operating mode and is therefore controlled by a vehicle operator or driver. In addition, the motor vehicle 4 is operated fully automatically in the second operating mode by the driver assistance system 6, i.e., it is controlled by the driver assistance system.

If the driver assistance system 6 is in the second operating mode for fully automatic vehicle operation, a pre-warning signal V is generated if, for example, a system error occurs in the driver assistance system 6 or if a traffic situation is detected, which renders manual control necessary. A corresponding system error may be caused as a result of a sensor system (not shown in more detail), which is required to operate the vehicle fully automatically, operating in a defective manner. The corresponding pre-warning signal V is then transmitted to the event data recorder 2 and, as a result, a control unit 8 included in the event data recorder 2 starts recording log data P. In some examples, the log data P is stored in a data storage 10. The log data P may include image data B from an interior camera 12, with the aid of which the behavior of the respective vehicle operator or driver of the motor vehicle 4 is recorded.

In some implementations, at the same time, the pre-warning signal V is transmitted to a display 14 of the motor vehicle 4, on the one hand, and to a loudspeaker system 16 in the motor vehicle 4, as a result of which the respective vehicle operator is informed or pre-warned, both visually and audibly, that he is to take over the vehicle operation. The driver assistance system 6 will change after a defined pre-warning interval $\Delta V$, for example 10 seconds, has elapsed following the transmission of the pre-warning signal V from a first status or operating mode "fully automatic" for fully automatic vehicle operation into a second status or operating mode "manual" for manual operation of the motor vehicle 4. A status change W therefore takes place.

In some examples, if the respective vehicle operator activates a control element 18 such as, for example, a pedal or the steering wheel prior to the end of the pre-warning interval $\Delta V$, this is registered by the driver assistance system 6 and the latter subsequently changes directly into the operating mode for manual operation of the motor vehicle 4. In this case, the status change W is therefore effected by a manual triggering by the vehicle operator.

The transition of responsibility to the vehicle operator may take place regularly with the status change W. If the vehicle operator does not react accordingly within the pre-warning interval $\Delta V$, the status change W automatically takes place following the end of the pre-warning interval $\Delta V$.

In some examples, irrespective of whether the status change between the operating modes of the driver assistance system 6 is triggered by a reaction of the vehicle operator, or after 10 seconds, the recording of the log data P is terminated by the control unit 8 following the end of a control interval $\Delta K$. The control interval $\Delta K$ begins in particular with the status change W.

In some implementations, if an accident occurs during an event interval $\Delta E$ during the recording of the log data, this is recorded for example with the aid of an accident detection system, for example, a collision sensor or distance sensor system 20, and the distance sensor system 20 transmits an accident event signal E to the control unit 8. As a result of this accident event signal, the log data P associated with this accident event is then stored permanently. The event interval $\Delta E$ begins in the example shortly after the pre-warning signal V and before the status change W or alternatively at the same time as the pre-warning signal V. It ends with the control interval $\Delta K$.

The data storage 10 may include multiple storage areas 22 and that storage area 22, in which the relevant log data P is stored, is blocked for the subsequent period. In some examples, the blocking is not lifted again until the blocked storage area 22 has been read out via an interface (which is not shown in more detail) and the log data stored therein has been backed up in an external device.

The remaining storage areas 22, i.e., the storage areas 22 which are not blocked, are used to implement rolling operation of the data storage 10. This means that log data P, i.e., including the image data B from the interior camera 12, is stored in a storage area 22 during each status change between the operating modes of the driver assistance system 6. If log data is then stored in all of the storage areas 22, the storage area 22 containing the oldest log data P may then be overwritten by new log data P during the next status change. In some examples, only the blocked storage areas 22 are excluded herefrom and are accordingly not overwritten, irrespective of whether the data concerned is the oldest log data P or not.

The disclosure is not restricted to the examples described above. Rather, other variants of the disclosure may be derived herefrom by the person skilled in the art, without departing from the subject matter of the disclosure. In particular, all of the individual features described in connection with the examples may also be combined with one another in other ways, without departing from the subject matter of the disclosure.

LIST OF REFERENCE NUMERALS

2 Event data recorder
4 Motor vehicle
6 Driver assistance system
8 Control unit
10 Data storage
12 Interior camera
14 Display
16 Loudspeaker system
18 Control element
20 Distance sensor system
22 Storage area
V Pre-warning signal
W Status change
E Accident event signal
ΔV Pre-warning interval
ΔK Control interval
ΔE Event interval
P Log data
B Image data

The invention claimed is:

1. An event data recorder for automatically logging a transition of responsibility during a status change of a motor vehicle between fully automatic operation in which the motor vehicle is controlled by a driver assistance system and manual operation, the event data recorder comprising:
   a data storage configured to store log data including data from at least one sensor configured to sense actions of a vehicle operator and accident reconstruction data such that accident events can be reconstructed; and
   a control unit configured to begin a time-limited recording of the log data by the data storage in response to receiving a pre-warning signal from the driver assistance system indicating an upcoming status change between the fully automatic operation and the manual operation that was not initiated by the vehicle operator.

2. The event data recorder of claim 1, wherein the log data includes a time of the pre-warning signal.

3. The event data recorder of claim 1, wherein the log data includes image data from an interior camera in the motor vehicle showing the actions of the vehicle operator.

4. The event data recorder of claim 1, wherein said control unit is further configured to terminate the time-limited recording of the log data in response to the elapse of a control interval following the status change between the fully automatic operation and the manual operation.

5. The event data recorder of claim 1, wherein the data storage is configured such that the log data is only stored permanently in the data storage when an accident event signal is transmitted to the control unit within a specified event interval.

6. The event data recorder of claim 1, which is configured such that the data storage is operated as rolling storage.

7. The event data recorder of claim 1, wherein the log data and the accident reconstruction data are recorded independently of each other and wherein the accident reconstruction data is stored in a separate data storage area than the log data.

8. A method for automatically logging a change of responsibility during a status change between fully automatic operation and manual operation of a motor vehicle, comprising:
   receiving a pre-warning signal indicating the status change between the fully automatic operation and the manual operation at a control unit;
   sensing actions of a vehicle operator with at least one sensor;
   sensing accident data with an accident detection system;
   recording the accident data in a data storage; and
   recording log data in the data storage including data from the at least one sensor in response to receiving the pre-warning signal from a driver assistance system signaling an upcoming status change between the fully automatic operation and the manual operation that was not initiated by the vehicle operator.

9. A motor vehicle configured to operate in a fully automatic mode or a manual mode, the motor vehicle comprising:
   a driver assistance system configured to operate the vehicle in the fully automatic mode and generate a pre-warning signal indicating an upcoming status change between fully automatic operation and manual operation that was not initiated by a vehicle operator;
   at least one sensor configured to sense actions of the vehicle operator;
   an accident detection system for sensing accident data; and
   an event data recorder configured to automatically log a transition of responsibility during a status change between the fully automatic operation and the manual operation, the event data recorder comprising
      a data storage configured to store log data including data from the at least one sensor and the accident data, and
      a control unit configured to begin a time-limited recording of the log data by the data storage in response to receiving the pre-warning signal from the driver assistance system.

10. The motor vehicle of claim 9, wherein the driver assistance system is additionally configured to emit at least one of an audible signal and visual signal in order to pre-warn the vehicle operator when the pre-warning signal occurs.

* * * * *